United States Patent [19]
Taenzer

[11] 4,452,084
[45] Jun. 5, 1984

[54] INHERENT DELAY LINE ULTRASONIC TRANSDUCER AND SYSTEMS

[75] Inventor: Jon C. Taenzer, Palo Alto, Calif.

[73] Assignee: SRI International, Menlo Park, Calif.

[21] Appl. No.: 436,446

[22] Filed: Oct. 25, 1982

[51] Int. Cl.³ ........................................... G01N 29/00
[52] U.S. Cl. ...................................... 73/609; 73/626; 73/642; 310/334; 310/365
[58] Field of Search .................. 73/609, 620, 625, 626, 73/629, 642, 644; 310/365, 334; 367/123, 157

[56] References Cited

U.S. PATENT DOCUMENTS

| | | | |
|---|---|---|---|
| 1,957,063 | 5/1934 | Hansell | 310/350 |
| 2,913,602 | 11/1959 | Joy | 73/644 |
| 2,963,597 | 12/1960 | Gerber | 310/365 |
| 3,059,130 | 10/1962 | Robins | 310/365 |
| 3,114,849 | 12/1963 | Poschenrieder | 310/365 |
| 3,166,731 | 1/1965 | Joy | 310/334 |
| 4,242,913 | 1/1981 | Mezrich et al. | 73/626 |

FOREIGN PATENT DOCUMENTS 2257865  5/1974  Fed. Rep. of Germany ...... 310/365

*Primary Examiner*—Stephen A. Kreitman
*Attorney, Agent, or Firm*—Victor R. Beckman

[57] ABSTRACT

An ultrasonic transmitting and/or receiving transducer is disclosed which includes a piezoelectric body with electrodes at opposite faces thereof. At least one of the electrodes is in the form of an elongated strip conductor such that the transducer also functions as a lossy delay line. The beam pattern of the transducer is dependent upon the delay of the delay line. A high permeability member such as a ferrite body is located adjacent the elongated strip conductor to increase the distributed inductance of the delay line and, consequently, the delay thereof. The permeability of the ferrite body is controlled by use of a drive coil adjacent thereto. By time varying the drive current to the coil, the acoustic beam pattern is time varied. By using a spiral shaped elongated strip conductor on a cylindrical shaped piezoelectric body, a focusing transducer is provided.

16 Claims, 15 Drawing Figures

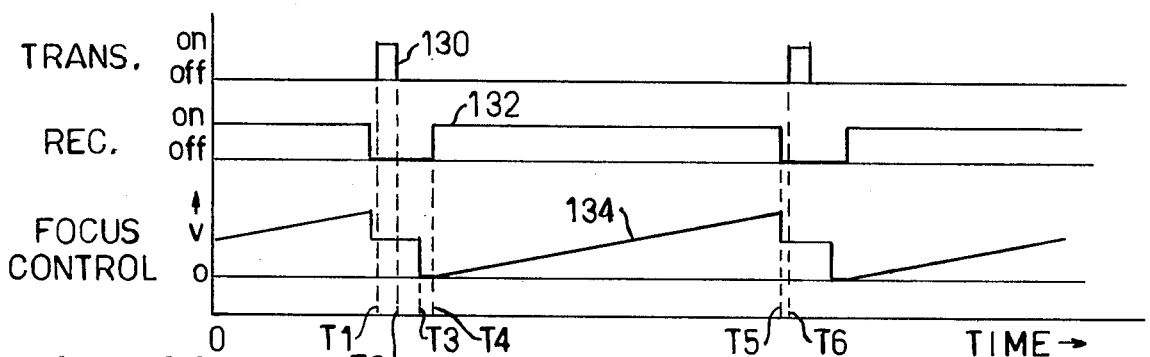
FIG-11
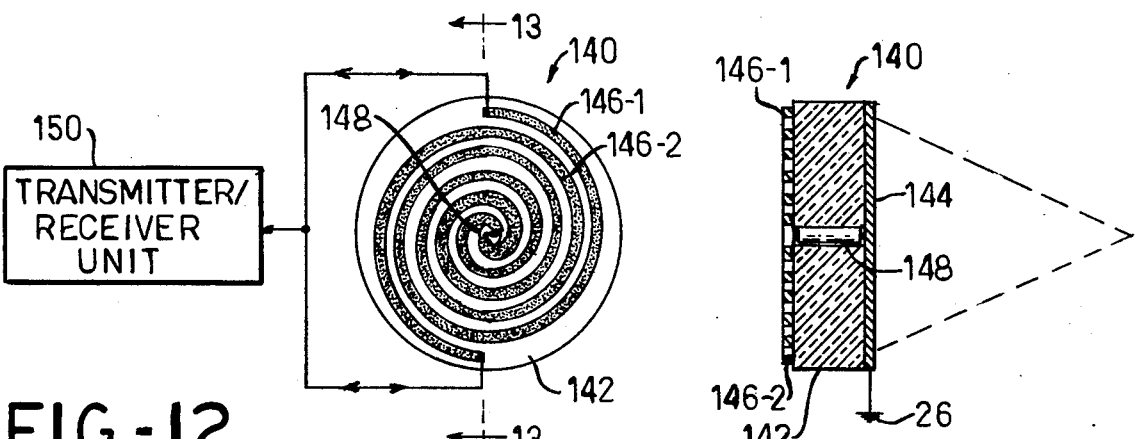
FIG-12
FIG-13
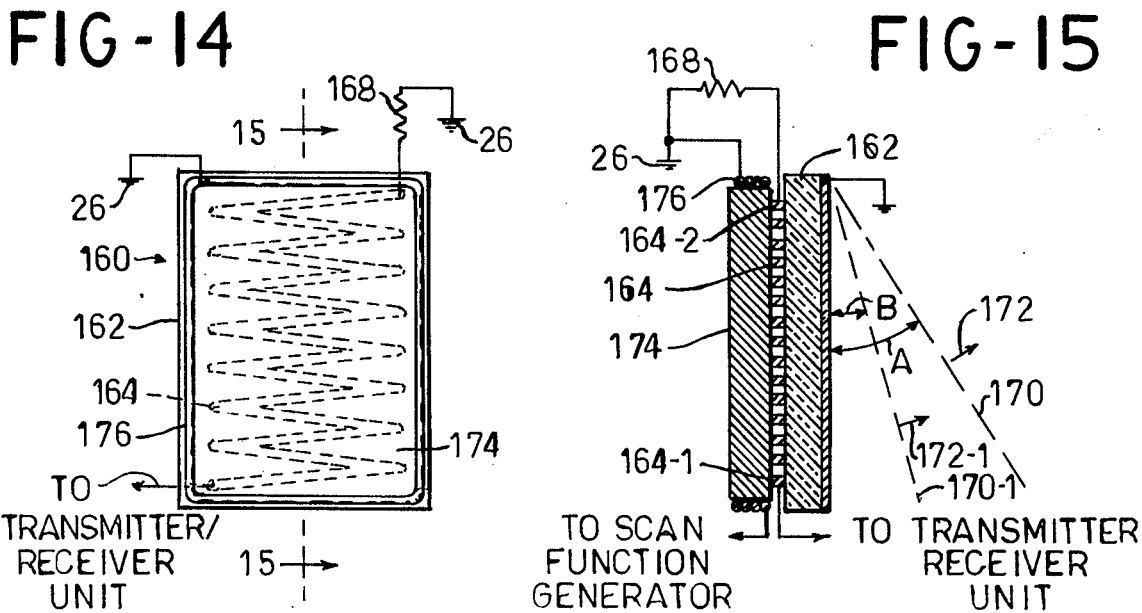
FIG-14
FIG-15

INHERENT DELAY LINE ULTRASONIC TRANSDUCER AND SYSTEMS

BACKGROUND OF INVENTION

Ultrasonic transducer means for beaming ultrasonic waves into an object and/or receiving ultrasonic waves are well known, of course, and, find many uses including use in ultrasonic nondestructive testing and inspection, ultrasonic examination in diagnostic medicine, and the like. Often a focused ultrasonic beam is required, as well as means for scanning the beam. Acoustic wave focusing by means of acoustic lenses, curved transducer bodies, acoustic focusing mirrors and the like, is well known, as is mechanical scanning. By using transducer arrays which include a plurality of individual transducer elements electronic focusing and beam scanning are possible. Further, electromechanical transducers which include one or more spiral electrodes are known as shown, for example, in U.S. Pat. Nos. 1,957,063—Hansel, 2,963,597—Gerber, 3,059,130—Robins, and 3,114,849—Poschenrieder. However, in none of the prior art arrangements is inherent delay of the transducer employed for focusing and/or scanning purposes.

SUMMARY OF THE INVENTION AND OBJECTS

An object of this invention is the provision of ultrasonic transducer means of the type having electrodes at opposite sides thereof which form a delay line for inherent delay in the propagation of electromagnetic waves therealong thereby affecting the direction of propagation and/or focusing of acoustic waves therefrom.

An object of this invention is the provision of ultrasonic transducer means of the above-mentioned type in which the impedance of the delay line varies from one end of the line to the opposite end for apodization control.

An object of this invention is the provision of ultrasonic transducer means of the above-mentioned type which includes a magnetic flux field source for control of the impedance of the delay line by control of the distributed inductance thereof.

An object of this invention is the provision of an improved dynamically focused ultrasonic transducer means whereby dnamic focusing is provided without the need for separate variable delay lines, or the like, in the connection of the transducer electrodes to ultrasonic transmitter and/or receiver means.

The above and other objects and advantages of this invention are achieved by use of a uniformly polarized piezoelectric body having electrodes at opposite faces thereof, at least one of which electrodes is in the form of an elongated strip conductor. The electrodes comprise a delay line for inherent delay in the propagation of electromagnetic waves therealong through distributed capacitance and inductance of the delay line. One end of the elongated strip conductor is connected to an ultrasonic transmitter and/or receiver, and the other end thereof is terminated in a load matching the impedance of the line thereat to prevent standing wave signals from developing as a result of a mismatch. The load may comprise a terminating resistor interconnecting the electrodes at opposite faces of the piezoelectric member, and/or the inherent acoustic load provided by the piezoelectric member at the end of the said elongated strip conductor. A focused ultrasonic beam transducer is provided by use of a flat cylindrical shaped piezoelectric member with at least one spiral shaped strip conductor at one face thereof. With the ultrasonic transmitter and/or receiver connected across the outer end of the spiral shaped strip electrode and the electrode at the opposite face of the piezoelectric member, delay in the propagation of the electromagnetic wave along the delay line provides for focusing of the transducer. A magnetic flux field source and high permitivity material may be located adjacent the transducer for control of the distributed inductance of the delay line for acoustic focusing. Dynamic acoustic focusing is provided by time varying the magnetic flux field strength during transmitting and/or receiving operation to time vary the delay of the line. A steered beam transducer is provided by use of a generally rectangular shaped piezoelectric member with at least one generally zig zag shaped strip conductor at one face thereof. With the ultrasonic transmitter and/or receiver connected across one end of the strip electrode and the electrode at the opposite face of the piezoelectric member, an acoustic beam pattern is provided which extends at an angle less than normal to the face of the transducer. The beam is steered by control of a magnetic flux field source which interacts with a high permitivity material, such as ferrite, which thereby varies the distributed inductance of the delay line to control the rate of propagation of the electromagnetic wave therealong. Since the transducer delay line is inherently lossy, transducers of the present type are inherently apodized. By employing a delay line having an increasing line impedance in going from one end to the opposite end thereof, control of apodization is provided. A tapered line, and/or a line in which the spacing between conductors at opposite faces varies in going from one end to the opposite end may be used to control the impedance of the line, and, consequently, apodization of the transducer.

BRIEF DESCRIPTION OF THE DRAWINGS

The invention, together with further objects and advantages thereof will be better understood from the following description considered with the accompanying drawings. It will be understood that the illustrated embodiments of the invention included herein are by way of example only, and that the invention is not limited thereto. In the drawings, wherein like reference characters refer to the same parts in the several views:

FIG. 11 are waveform diagrams of electrical signals developed at various locations within the system shown in FIG. 10 for use in explaining the operation thereof;

FIG. 12 is a plan view of another ultrasonic transducer embodying the present invention using electrically parallel connected strip electrodes;

FIG. 13 is a cross-sectional view taken along line 13—13 of FIG. 12;

FIG. 14 is a plan view of another ultrasonic transducer embodying this invention for use in beam scanning; and FIG. 15 is a cross-sectional view taken along line 15—15 of FIG. 14.

Figure 1:
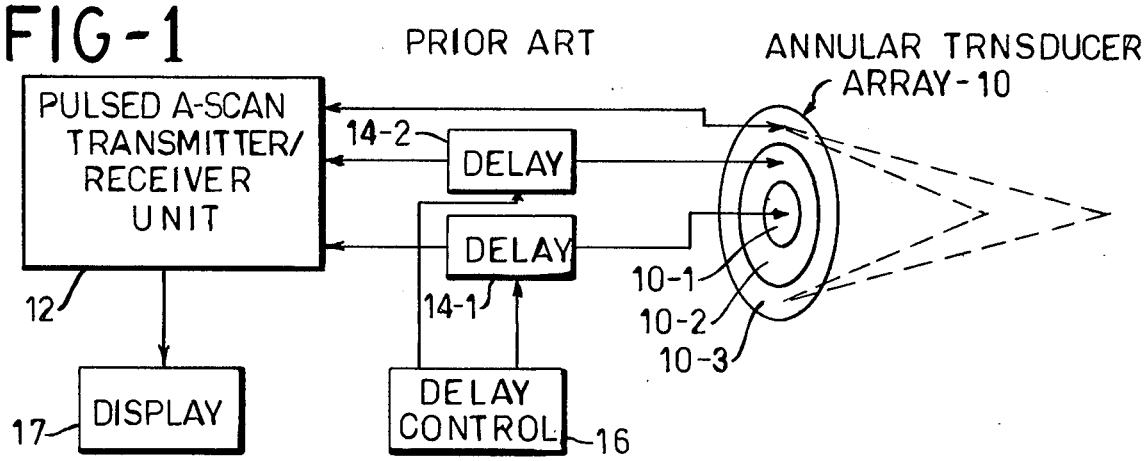
FIG. 1 is a block diagram illustrating a prior art ultrasonic imaging system which includes a concentric annular transducer array and variable delay means for control of the transducer focus.

Reference first is made to the prior art ultrasonic apparatus shown in FIG. 1 of a pulsed A-scan system which includes electrical means for varying the focal point of the ultrasonic transducer array 10 included therein. For purposes of illustration, an annular type transducer array 10 is diagrammatically shown, comprising a center element 10-1 and outer annular elements 10-2 and 10-3. Electrodes of the transducer elements are connected to a pulsed A-scan transmitter/receiver unit 12. Variable delay units 14-1 and 14-2 are included in the connection of the transducer elements 10-1 and 10-2, respectively, to the transmitter/receiver unit.

Recurrent high frequency energy pulses are supplied to the transducer array 10 by the transmitter for pulse insonification of an object, not shown. Focusing is provided by the electrical signal delays provided by delay units 14-1 and 14-2. The receiver is gated on after a delay period following transmission of an ultrasonic pulse for receiving echo signals from within a range of depths along the beam within the object. The delay of units 14-1 and 14-2 is dynamically varied by delay control unit 16 during the receiving portion of the cycle to provide dynamic focusing. At the receiver, the outputs from the individual elements of the transducer array are added and supplied to display 17 for A-scan display thereof. Problems with such prior art electrically focused systems include difficulty matching the operation of the delay units 14-1 and 14-2, noise and signal filtering produced by them, and the cost thereof. Applicant eliminates the need for delay elements in the connection of the ultrasonic transducer to the transmitter/receiver unit and, instead, relies upon inherent delay provided by the novel transducer of this invention for delay of transmitted and/or received signals for focusing, beam scanning, or the like.

Figure 2:
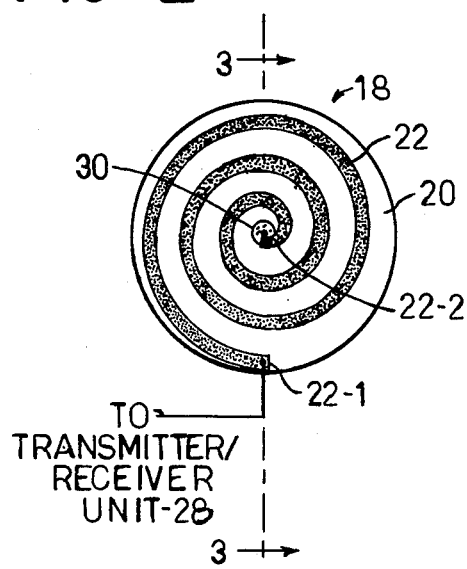
FIG. 2 is a plan view of an ultrasonic transducer embodying the present invention.
Figure 3:
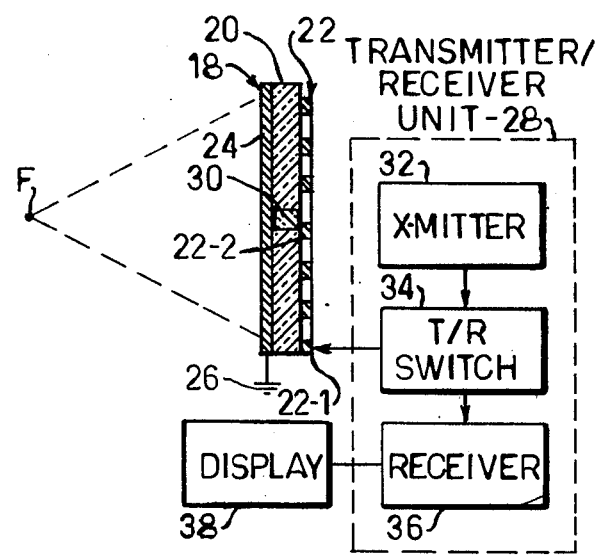
FIG. 3 is a cross-sectional view taken along line 3—3 of FIG. 2, and also showing in block diagram form a transmitter/receiver unit connected thereto.

Reference now is made to FIGS. 2 and 3 wherein one form of ultrasonic transducer 18 embodying the present invention is shown comprising a flat cylindrical shaped body 20 of piezoelectric material of any well known type. For example, lead zirconate or a titanate material such as barium titanate may be used which is uniformly polarized normal to the opposite parallel faces during manufacture as by exposure to a unidirectional electric field thereacross while heated above the Curie temperature.

Electrodes 22 and 24 are provided at opposite faces of the transducer body, at least one of which electrodes is in the form of an elongated strip conductor. In the embodiment of the invention illustrated in FIGS. 2 and 3, the one electrode 22 is in the form of a spiral having an outer end 22-1 adjacent the outer edge of the piezoelectric member 10 and an inner end 22-2 adjacent the center thereof. Electrode 24 is of a circular shape, covering the opposite face of the piezoelectric member 20. With this arrangement of electrodes, the electrodes comprise elements of a delay line, with the electrode 24 constituting a ground plane for the strip electrode 22. The piezoelectric material 20 is non-conducting and forms the dielectric of the delay line.

Figure 4:
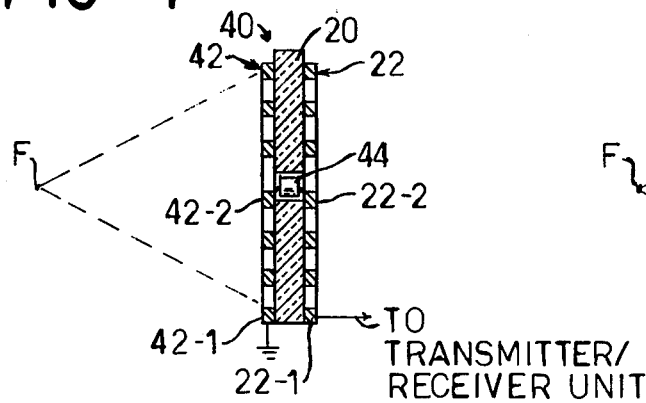
FIG. 4 is a cross-sectional view which is similar to that of FIG. 3 but showing a modified form of this invention employing parallel elongated strip conductors at opposite faces of the piezoelectric member.
Figure 5:
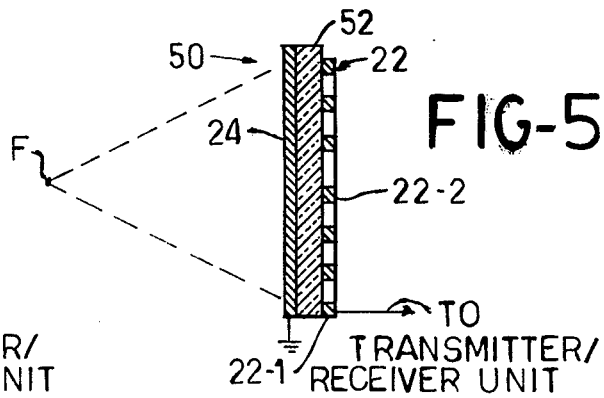
FIG. 5 is a cross-sectional view which also is similar to that of FIG. 3 and showing another modified form of this invention in which the elongated strip conductor is terminated in the matching acoustic impedance of the piezoelectric member.

As seen in FIG. 3, electrode 24 of the delay line is connected to ground 26, and the outer end 22-1 of strip electrode 22 of the delay line is connected to a transmitter/receiver unit 28. The inner end 22-2 of the strip electrode is terminated in a load impedance substantially matching the impedance of the delay line thereat. In the FIG. 3 arrangement, the load impedance comprises resistor element 30, one end of which is electrically connected to the inner end 22-2 of the strip electrode, and the other end of which is connected to the plane electrode 24. The resistor element 30 is located in a hole extending through the center of the piezoelectric member 20. The resistor 30 may be integrally formed with the piezoelectric member 20, as shown in FIG. 3. Alternatively, a discrete resistor may be employed, such as shown in FIG. 4, or the matching load impedance for the strip line simply may comprise the acoustic impedance of the piezoelectric member 20 at the inner end of the strip conductor, such as shown in FIG. 5 and described below. In any event, termination of the delay line in a matching impedance is desired to prevent standing wave signals from developing as a result of a mismatch at the termination of the strip conductor at the inner end thereof.

The transmitter/receiver unit 28 includes a pulse transmitter 32 connected through a transmit/receive switch 34 to the outer end 22-1 of strip electrode 22 for recurrent pulse energization of the transducer. The grounded, outer, electrode 24 is acoustically coupled to an object, not shown, to be examined. Upon energization of the transducer by an output from the transmitter, an electromagnetic wave is propagated along the strip transmission line. Inherent delay in the propagation of the transmitted electromagnetic wave along the strip conductor provides a focusing action for acoustic waves generated by the transducer. A constant width, constant pitch, spiral, such as illustrated in FIGS. 2 and 3, provides the substantially quadratic delay taper necessary for ideal focusing of the transmitted acoustic wave. In FIG. 3, the transducer is shown focused at point F.

Reflections from discontinuities within the object under examination are received by the transducer 18 for production of an electrical signal which is supplied through the transmit/receive switch 34 to a range gated receiver 36. The receiver 36 may be gated on for reception of signals received from a range along said focal point F, and the output from the receiver 36 supplied to a display unit 38 for A-scan display thereof. During reception, the transducer 18 continues to operate for beam focusing at focal point F due to inherent delay in the transmission electromagnetic wave energy along the strip line conductor 22. The delay, and therefore the focal point of transducer 18 is dependent upon the distributed capacitance and inductance of the delay line comprising the piezoelectric body 10 and electrodes 22 and 24 at the opposite faces thereof.

Prior art annular transducer arrays, such as schematically shown in FIG. 1, often require that the active, center and annular, electrodes be positioned at the front of the array. With applicant's novel transducer, the front electrode may be grounded, as seen in FIG. 3. Where the transducer is employed for ultrasonic diagnosis of humans, the use of a grounded front electrodes contributes to patient safety. Additional advantages of a grounded front electrode include reduced electrical interference and minimization of radio frequency interference. Despite such advantages, if desired, the piezoelectric face carrying electrode 22 may be employed as the front of the transducer, with electrode 24 at the back of the transducer.

Many modified forms of ultrasonic transducers which embody the present invention and different systems employing the same will be apparent. For example, the piezoelectric body may be formed with opposing spiral electrodes, such as shown in FIG. 4. There, the cyclindrical-shaped piezoelectric body 20 of the transducer 40 is shown provided with spiral front and rear electrodes 42 and 22, respectively, located directly opposite each other at opposite faces of the body. The outer end 40-1 of the front electrode 40 is connected to ground 26, and the inner end 42-2 thereof is connected to a resistor 44. The other terminal of the resistor 44 is connected to the inner end 22-2 of the back electrode 22, and the outer end 22-1 of electrode 22 is adapted for connection to a transmitter/receiver unit, not shown in FIG. 4. Discrete resistor 44 matches the impedance of the delay line at the inner end thereof to prevent standing waves. The transducer is focused at focal point F for both transmitting and receiving operations thereof.

In another modified form of transducer shown in FIG. 5, to which reference is made, the strip electrode is terminated in the acoustic impedance of the piezoelectric transducer body thereof, which matches the impedance of the strip line thereat. There, the transducer 50 is shown to comprise a cylindrical body 52 having a strip line conductor 22 at the rear face thereof and a plane, grounded, electrode 24 at the opposite, front, face. No load resistor is required at the inner end 22-2 of the spiral electrode 22 since the mechanical load impedance of the piezoelectric body matches the electrical impedance of the electrode 22 at the inner end 22-2 thereof. By matching impedances, a mismatch at the termination 22-2 of strip conductor 22 is avoided, thereby avoiding problems of standing waves along the delay line.

Figure 6:
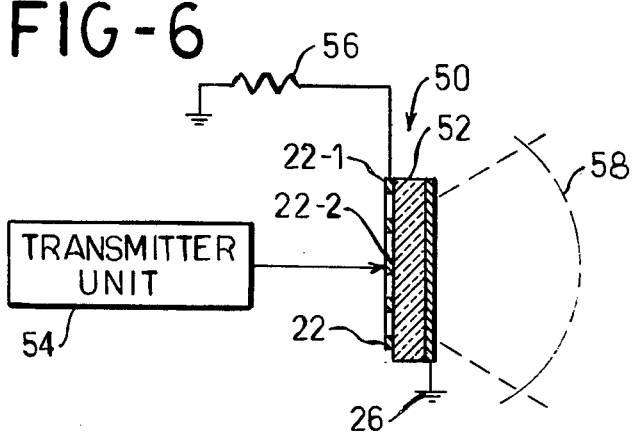
FIG. 6 shows a transmitting transducer of the type shown in FIG. 5 but which is driven from the inner end of the spiral electrode for production of an expanding acoustic wavefront, rather than a focused wavefront.

An expanding, rather than a focused, wavefront may be produced using any of the transducers shown in FIGS. 2–5 simply by driving the same from the inner end of the spiral electrode, rather than the outer end thereof. Such an arrangement is shown in FIG. 6 to which reference now is made. There, a transducer 50, of the type shown in FIG. 5, is shown together with a transmitter 54 connected to the inner end 22-2 of spiral electrode 22. The outer end 22-1 of electrode 22 is connected to ground 26 through a load resistor 56 which matches the impedance of the strip conductor 22 at the end thereof. By driving the transducer from the center, an acoustical wave with an expanding wavefront, identified by reference numeral 58 is produced, due to inherent delay in the propagation of the driving electromagnetic wave in travelling along the conductor 22 from the inner end 22-2 to the outer end 22-1 thereof.

In the propagation of electromagnetic waves along the delay line electrodes of the present transducers, energy is lost through radiation of said ultrasonic waves. Also, energy is lost in the piezoelectric material of the transducer body. Because of such energy losses, the effectiveness (or effective sensitivity) of the transducer varies in going from the center to the outside thereof. When, for example, the transducers of FIGS. 2–5 are employed as focused transducers, wherein the transmitter and/or receiver is connected to the outer end of the spiral electrode, that portion of the transducer adjacent the periphery is more effective than the center thereof in the generation and/or reception of acoustic waves. For this operation, the transducer has a so-called "reverse" apodization.

Figure 7:
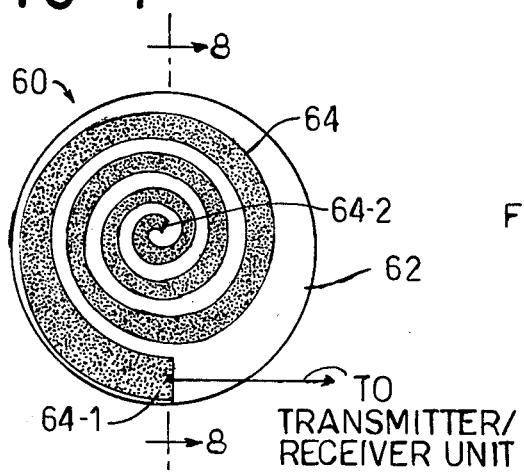
FIG. 7 is a plan view of an ultrasonic transducer which is similar to that of FIG. 1 but showing use of a tapered electrode for apodization control.
Figure 8:
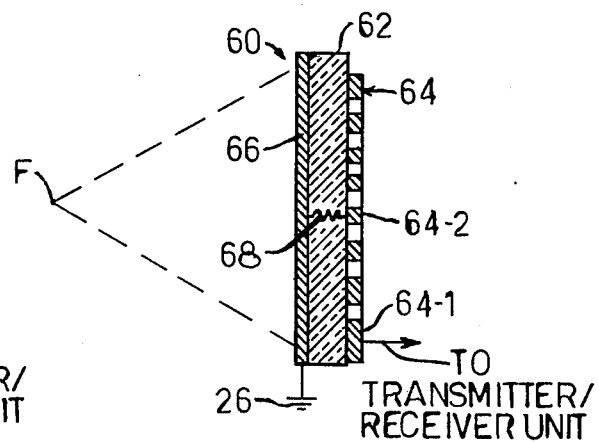
FIG. 8 is a cross-sectional view taken along line 8—8 of FIG. 7.

To compensate for energy losses of the delay line, and the resultant "reverse" apodization, a tapered impedance delay line may be employed. One means for producing an impedance taper is to provide the spiral electrode, or electrodes, with a tapered width, such as shown in FIGS. 7 and 8. There, a transducer 60 is shown comprising a cylindrical shaped body 62 of piezoelectric material, a spiral electrode 64 at one face thereof, and a plane electrode 66 at the opposite face. A matching load resistor 68 is schematically shown connecting the inner end 64-2 of electrode 64 to electrode 66. The outer end 64-1 of the spiral electrode is adapted for connection to a transmitter and/or receiver. As seen in the drawings, the spiral electrode 64 tapers in width in going from the outer to the inner end thereof. As a result, the impedance of the resultant inherent delay line also tapers, with the impedance of the line being minimum at the outer end and maximum at the inner end thereof, adjacent the center of the transducer. With a tapered impedance, electromagnetic wave voltage can be made to remain constant in going from the outer end of the spiral electrode to the inner end thereof. Additionally, it will be noted that the pitch of the tapered spiral electrode 64 reduces in going from the outer end to the inner end of the spiral to increase electrode coverage of the piezoelectric body, compared to a constant pitch tapered spiral electrode arrangement. With this tapered impedance, tapered pitch arrangement, the "reverse" apodization of the transducer 60 is less than that of transducers 20, 40 and 50, described above, providing transducer 60 with a flatter acoustical response across the face of the transducer.

Figure 9:
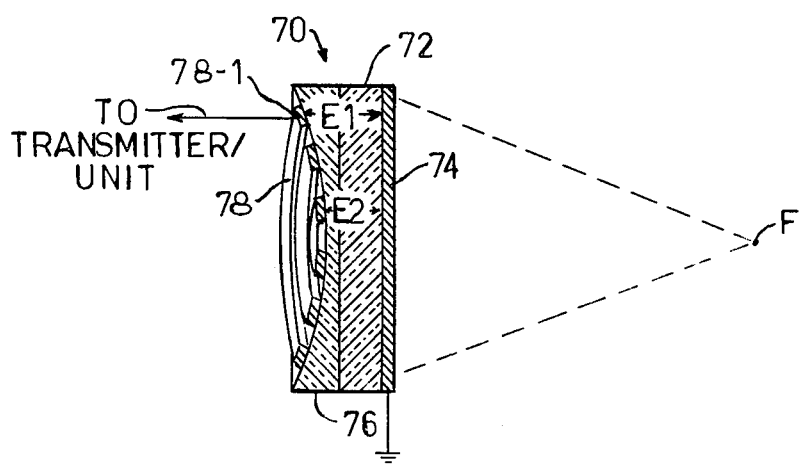
FIG. 9 is a cross-sectional view of another modified form of this invention with apodization correction by progressive change in distributed capacitance of the spiral conductor.

Other means for tapering the impedance of the inherent delay line are possible, including varying the space between the line conductors. In FIG. 9, to which reference is made, a transmitting transducer 70 is shown comprising a cylindrical piezoelectric body 72 with a plane electrode 74 at the front face thereof. An insulating member 76 having a concave rear face is attached to the rear of the piezoelectric member 72, and a spiral electrode 78 of uniform width and pitch is attached to the concave face of the insulating member. The outer end 78-1 of the spiral electrode is connected to a transmitter unit, and the inner end of the electrode is terminated in the impedance of the delay line thereat. Upon energization of the electrode by an ultrasonic electrical signal from the transmitter, it will be apparent that although the electromagnetic wave energy decreases in traveling along the lossy delay line, there is not a corresponding decrease in electrical field gradient through the piezoelectric member since the outer turns of the spiral electrode are further spaced from the ground plane electrode 74 than the inner turns. Thus, electric field E2 at the center of the transducer may be made substantially equal to electric field E1 adjacent the perimeter thereof, for production of equal strength acoustical energy over the face of the transducer. As with the other embodiments of the invention described above, acoustical focusing is provided because of the delay in travel of the electromagnetic wave along the transmission line electrodes.

Figure 10:
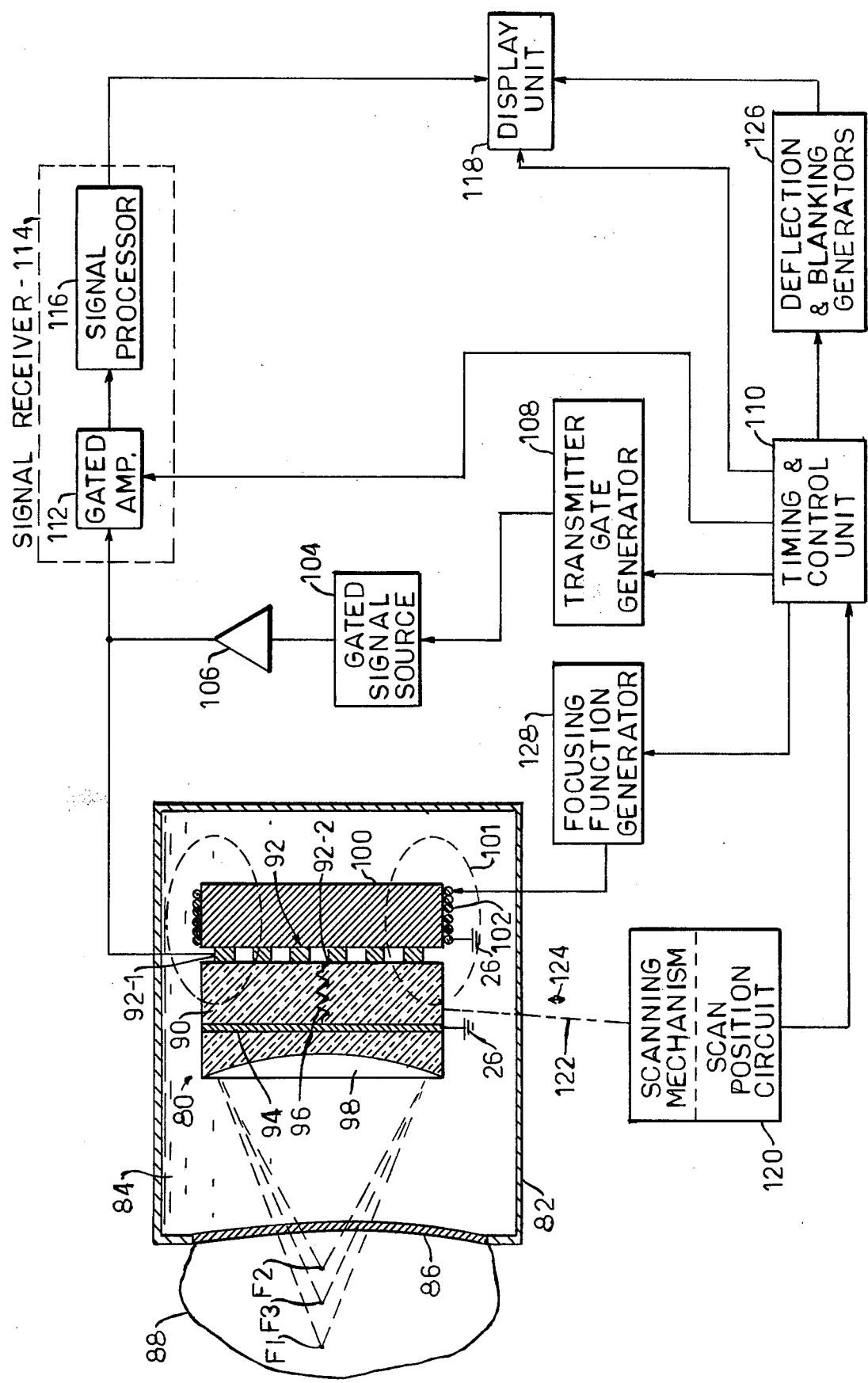
FIG. 10 is a block diagram of an ultrasonic B-scan imaging system utilizing a dynamically focused transducer of a type embodying the present invention.

As described above, the focal point F provided by the focusing transducers of this invention depend, among other things, upon the time delay provided by the inherent delay line. By changing the inductance of the delay line, the delay and thus the acoustic focus of the transducer may be changed; and by dynamically varying the inductance, the focus of the transducer may be dynamically varied. A novel dynamically focused transducer, together with an ultrasonic imaging system embodying the same, is shown in FIG. 10 to which figure reference now is made. There, an ultrasonic transducer 80 is shown positioned in a container 82 filled with an acoustic coupling liquid 84. An acoustically transparent window 86 is provided in the container for coupling of acoustic waves to an object 88 to be examined.

The transducer 80 comprises a cylindrical shaped piezoelectric body member 90 having a spiral electrode 92 at the rear face and a plane, grounded, electrode 94 at the front face thereof. The inner end 92-2 of the spiral electrode is connected through a load impedance 96 to the front electrode 94 to terminate the inherent delay line in the impedance of the line at the inner end thereof. As described thus far, the transducer may be of the type described above and shown in FIGS. 2 and 3.

If desired, the transducer may be provided with an acoustic lens, such as lens 98 shown in FIG. 10. By combining acoustic lens focusing with inherent delay line focusing, less delay is required for focusing adjacent the transducer. Also, the inductance of the inherent delay line is increased by use of a ferrite member, or plug, 100 attached to the back of the transducer adjacent the spiral line 92. As is well understood, delay of a line is dependent upon the distributed inductance thereof; the delay increasing with an increase in the inductance. Because the delay of the line is increased by the use of the ferrite member 100, the transducer focal point is moved closer to the transducer by inclusion of the ferrite member in the transducer construction.

The permeability, $\mu$, of the ferrite member 100 is controlled by use of a magnetic field provided by a drive coil 102 wound around the ferrite member. By controlling the current flow through the coil, the permeability of the ferrite member and the inductance of the delay line are controlled for control of the focal point of the acoustic transducer. As the inductance of the inherent delay line is increased, the focal point is moved closer to the transducer from point F1 to point F2. It here will be noted, that by attaching ferrite member 100 to the back of the transducer body, the frequency bandwidth of the transducer also is broadened due to the mechanical loading of the transducer by the ferrite member as is well known transducer practice. It will be seen, then, that by simply controlling current flow through the coil 102, the focus of the transducer is dynamically controlled. A B-scan ultasonic imaging system employing the novel transducer is shown in FIG. 10.

The spiral electrode 92 of the transducer 80 is supplied with a broad band pulse from a gated signal source 104 through an amplifier 106 for pulse insonification of the object 88. The signal source 104 is recurrently gated on by use of a transmitter gate generator 108 under control of signals from a timing and control unit 110. Periodic pulse operation generally is employed, although aperiodic and continuous wave mode operation may be used.

Ultrasonic pulses reflected from boundries and internal discontinuities of the subject 88 are received by the transducer 80 and the resultant electrical signals are supplied to a gated amplifier 112 which is gated on and off during the receiving and transmitting portions, respectively, of the operating cycle under control of the timing and control unit 112. Obviously, a transmit/receive switch, such as shown in FIG. 3, could be employed in the connection of the transducer 80 to the signal source 104 and signal receiver 114, which switch would eliminate the need to gate the amplifier to prevent blocking of the receiver by the transmitter pulses. The receiver 114 includes a signal processor 116 which may include a variable gain amplifier to which the gated receiver signals are supplied. The variable gain amplifier may be time varied in accordance with the lapsed time from the last transmitted pulse for increased amplifier gain in proportion to range in such a manner to offset the loss of signal caused by acoustic absorption within the subject. The receiver may include a broad band compression amplifier for compression amplification of the output from the variable gain amplifier. In addition, an envelope or other detector may be included in the receiver for envelope detection of the compression amplifier output signal. The above-described signal receiver is of conventional design and requires no additional description. For B-scan operation, the receiver output is supplied to the control grid of a cathode ray tube display 118 for intensity modulation of the electron beam. It here will be noted that for A-scan operation, the receiver output simply may be supplied as a deflection signal to a cathode ray tube for defection of the beam in one direction while a ramp signal synchronized with the transmitter operation is supplied as a deflection signal for deflection of the beam in an orthogonal direction.

For the illustrated B-scan operation, the transducer 80 is moved with a scanning motion relative to the subject 88. In FIG. 10 the transducer 10 is shown connected to a scanning mechanism 120 through a mechanical linkage 122. Linear and/or sector scanning may be employed and, for purposes of illustration, linear scanning across the object 88 in the direction of double headed arrow 124 is shown. The scanning mechanism includes a scan position information circuit having an output which is connected to the timing and control unit 110. Outputs from the timing and control unit 110 are used for synchronizing the transmitting, receiving and display scanning operations, and controlling operation of a deflection and blanking generator 126. One output from generator 126 comprises a deflection voltage which is proportional to the transducer position along its scan path, and another output which is proportional to the time elapsed since the last pulse was transmitted. Obviously, other scanning arrangements are possible.

For use in both A and B scan operations, wherein the return signals are received from a range of distances within the subject, current through the coil 102 is time varied in accordance with the lapsed time from the last transmitted pulse, for varying the focal point of the transducer between points F2 and F1. In accordance with the present invention the current through the coil 102, and therefore the focusing of the transducer 80, is varied in accordance with the output from a focusing function generator 128. During receiving operation, the output from the generator 128 increases to increase current flow through the coil 102 for dynamic focusing of the transducer from focal point F2 to focal point F1. In the illustrated arrangement, during pulse transmission the coil current is controlled for focusing at a point F3 intermediate points F2 and F1.

Although the operation of the ultrasonic imaging system shown in FIG. 10 is believed to be apparent from the above description, a brief description thereof with reference to the timing diagram of FIG. 11 now will be provided. The transducer 80 is moved across the object 88 in the direction of arrow 124 by the scanning mechanism 120. A scan position signal is produced by the scan position control circuit of the scanning mechanism and supplied to the timing and control unit 110 from which control signals for timing the operation of the transmitter, receiver, and cathode ray tube scanning means are obtained. Broadband narrow beam ultrasonic waves are generated during the transmit pulse period 130 shown in FIG. 11, which pulse is initiated at time T1 and is terminated at time T2. The pulse travels through the lens 98 and into the subject 88 to be reflected at the interface between the subject and window 86, and from different levels at discontinuities within the subject. After a time delay period, between times T2 and T4, the receiver is gated on for processing the echo signals as shown at 132 of FIG. 11. During operation of the receiver, between times T4 and T5, the focus function generator 128 output, identified by curve 134, increases for decreasing the inductance, and consequently the delay of the transducer delay line thereby increasing the focal length of the transducer as echo signals are received from increasing depth within the subject. At time T5, the receiving operation is terminated, another transmitter pulse is generated at time T6, and the above-described cycle is repeated. During operation of the transmitter, between times T1 and T2, the focus function generator output is intermediate the upper and lower levels thereof for focusing of transducer pulses at focal point F3 intermediate points F1 and F2. Obviously, control of the focus control generator during pulse transmission for focusing at some other level than at point F3 is possible.

A modified form of focusing transducer employing a plurality of concentric spiral electrodes at one face thereof is shown in FIGS. 12 and 13, to which figures reference now is made. There, a focusing transducer 140 is shown comprising a cylindrical body 142 of piezoelectric material with a plane electrode 144 at the forward face thereof. The rear surface of the body 142 is provided with a plurality of concentric electrodes; here two electrodes 146-1 and 146-2. The inner ends of the spiral electrodes are connected together and through an impedance matching load resistor 148 to the electrode 144. The outer ends of the spiral electrodes are connected together and to a transmitter/receiver unit 150. With this arrangement, wherein the spiral delay line electrodes are in electrical parallel connection, the electrical impedance is reduced which may provide for better impedance matching between the transducer and the transmitter and/or receiver connected thereto. As with the above-described transducers of this invention focusing of the transducer 140 is provided by reason of the inherent delay in the propagation of the electromagnetic waves along the lines in travelling from the perimeter of the piezoelectric body to the center thereof.

The invention is not limited to use of the inherent delay provided by the electrode configuration of an ultrasonic transducer to provide for focusing of a beam. In another modified form of this invention shown in FIGS. 14 and 15, an ultrasonic beam scanning transducer 160 is shown comprising a rectangular shaped piezoelectric body member 162 of uniform thickness having a strip electrode 164 at one face thereof and a plane electrode 166 at the opposite face. In this embodiment, the electrode 164 is of a zig-zag shape, rather than spiral shape. The zig-zag shaped electrode 164 extends from one end of the piezoelectric member to the opposite end thereof.

One end 164-1 of the zig-zag electrode 164 is adapted for connection to an ultrasonic transmitter and/or receiver unit, not shown, and the other end 164-2 thereof is connected to ground 26 through a matching load resistor 168. As with the other transducers embodying this invention, an inherent delay is provided in the travel of an electromagnetic wave along the elongated strip electrode of the transducer. Where the zig-zag electrode has a substantially constant pitch, such as electrode 164, an acoustical wave having a substantially plane wavefront 170 is produced upon energization of the transducer. Due to the delay in travel of the electromagnetic wave along the delay line transducer structure, the wave front 170 extends at an angle A to the surface of the plane electrode 166, for travel in the direction of arrow 172.

By controlling the delay of the inherent delay line, the direction of the acoustical wave may be controlled. In the arrangement of FIGS. 14 and 15, a high permeability member 174, such as a block of ferrite, is attached to the back of the piezoelectric body 162 adjacent the zig zag electrode 164 which, as described above, increases the inductance of the electrode 164. A coil 176 is provided around the edge of the ferrite block 174, which is adapted for connection to a scan function generator, not shown, for supply of a variable current to the coil for control of the permeability of the ferrite block. With increased coil current, the permeability of the ferrite block 174 is decreased thereby decreasing the inductance of the delay line. The velocity of the electromagnetic wave propagated along the delay line thereby is increased for a decrease in the delay of the line whereby the wavefront of the acoustic wave field is moved into a position closer to the plane of the front face of the transducer. With an increase in coil current, an acoustical energy wave with a front identified by reference numeral 170-1 travelling in the direction of arrow 172-1 is produced. A scanning motion of the acoustic wave is provided by supplying the coil 176 with a varying current. Scanning of the acoustic wave during either or both transmitting and receiving operations is possible, of course. it will be apparent that the transducer 160 may be used with an acoustic lens for focusing of the acoustical energy wave transmitted and/or received thereby.

The invention having been described in detail in accordance with requirements of the Patent Statutes, various other changes and modifications will suggest themselves to those skilled in this art. For example, a ferrite backing member, or the like, may be included at the rear of the transducer adjacent the elongated electrode for increasing the inductance of the delay line, without the use of a coil for varying the permeability of the member, if desired, where a variable delay is not required. Additionally, the use of permanent magnets for control of the permeability of the ferrite backing member is contemplated. Also, many other means for affecting the inductance of the delay line are possible, in addition to the use of a ferrite backing member. For example, the elongated conductor may be coated, or covered, with a ferrite material while leaving the remainder of the back of the transducer peizoelectric body member free thereof to provide for an "air-backed" transducer. Various manufacturing techniques including thin film, thick film, photo-lithograpy, and the like, may be used in the manufacture of the transducers, particularly for forming the electrodes and ferrite deposition in "air-backed" applications. Also, as noted above, any suitable piezoelectric material may be used, the invention not being limited to any particular type. In addition, the invention is not limited to use with the illustrated spiral and zig-zag electrodes. Other elongated electrode configurations may be used in which delay provided by the line is employed for focusing or other acoustic beam control. Also, the taper and pitch of the spiral electrodes may be selected to provide the transducer with different focusing effects.

In addition, although liquid acoustic coupling means for coupling the transducer to an object under examination are shown in the drawings, it will be apparent that all solid acoustic coupling means may be employed if desired. Also, other acoustic wave focusing means than the illustrated lens may be associated with the transducer. For example, the transducer body may be provided with a curved, rather than flat, surface for focusing. Alternatively, a curved mirror may be positioned along the acoustic axis of the transducer. It is intended that the above and other such changes and modifications shall fall within the spirit and scope of the invention as defined in the appended claims.

I claim:

1. An ultrasonic transmitting and/or receiving transducer for generating and/or receiving compressional acoustic waves for use in ultrasonic examination of an object, said transducer comprising,
    a piezoelectric member having first and second opposite faces,
    first and second electrode means disposed on said first and second faces, respectively,
    at least one of said electrode means being in the form of an elongated strip conductor which, together with the other of said electrode means comprises a delay line for inherent delay in the propagation of electromagnetic waves therealong through distributed capacitance and inductance of the delay line,
    means for acoustically coupling one face of said piezoelectric member to an object under ultrasonic examination,
    electrical resistor means for terminating one end of the elongated strip conductor in a load impedance which substantially matches the impedance of the delay line at said one end to prevent standing wave signals from developing along said delay line, and
    means forming a hole through said piezoelectric member for said electrical resistor means, said electrical resistor means interconnecting said first and second electrodes.

2. An ultransonic transmitting and/or receiving transducer for generating and/or receiving compressional acoustic waves for use in ultrasonic examination of an object, said transducer comprising,
    a piezoelectric member having first and second opposite faces,
    first and second electrode means disposed on said first and second faces, respectively,
    at least one of said electrode means being in the form of an elongated strip conductor which, together with the other of said electrode means comprises a delay line for inherent delay in the propagation of electromagnetic waves therealong through distributed capacitance and inductance of the delay line,
    means for acoustically coupling one face of said piezoelectric member to an object under ultrasonic examination,
    said piezoelectric member having a substantially cylindrical shape, and said elongated strip conductor having a substantially spiral shape with the inner end of the spiral-shaped conductor terminating adjacent the center of one face of said piezoelectric member, the width of said spiral-shaped conductor tapering in going from one end to the other end thereof for modification of delay line impedance as the conductor width changes for control of apodization of the ultrasonic transducer.

3. An ultrasonic transducer as defined in claim 2 wherein the pitch of the tapered spiral-shaped conductor decreases as the width thereof decreases.

4. An ultrasonic transducer as defined in claim 3 wherein the inner end of the tapered spiral-shaped conductor is of a narrower width than the outer end thereof.

5. An ultrasonic transmitting and/or receiving transducer for generating and/or receiving compressional acoustic waves for use in ultrasonic examination of an object, said transducer comprising,
    a piezoelectric member having first and second opposite faces,
    first and second electrode means disposed on said first and second faces, respectively,
    at least one of said electrode means being in the form of an elongated strip conductor which, together with the other of said electrode means comprises a delay line for inherent delay in the propagation of electromagnetic waves therealong through distributed capacitance and inductance of the delay line,
    means for acoustically coupling one face of said piezoelectric member to an object under ultrasonic examination,
    said piezoelectric member having a substantially cylindrical shape, and said elongated strip conductor having a substantially spiral shape with the inner end of the spiral-shaped conductor terminating adjacent the center of one face of said piezoelectric member,
    means for connecting the outer end of said spiral-shaped conductor to transmitter means for energizing said transducer for beaming focused ultrasonic energy into said object, and
    high permeability means adjacent said elongated strip conductor for increasing the distributed impedance of the delay line thereby reducing the propagation rate of electromagnetic waves therealong and moving the beam focus closer to said transducer.

6. An ultrasonic transducer as defined in claim 5 including,
a magnetic flux field source linking with said high permeability means for controlling the permeability thereof and thereby controlling the rate of propagation of electromagnetic waves along said delay line and the beam focus of said transducer.

7. An ultrasonic transducer as defined in claim 6 wherein said magnetic flux field source comprises a coil adjacent said high permeability means, and
a current supply source connected to said coil for energizing the same.

8. An ultrasonic transducer as defined in claim 7 wherein said current supply source is variable for varying the strength of said magnetic flux field and the permeability of said high permeability means.

9. An ultrasonic transmitting and/or receiving transducer for generating and/or receiving compressional acoustic waves for use in ultrasonic examination of an object, said transducer comprising,
a piezoelectric member having first and second opposite faces,
first and second electrode means disposed on said first and second faces, respectively,
at least one of said electrode means being in the form of an elongated strip conductor which, together with the other of said electrode means comprises a delay line for inherent delay in the propagation of electromagnetic waves therealong through distributed capacitance and inductance of the delay line,
means for acoustically coupling one face of said piezoelectric member to an object under ultrasonic examination, and
high permeability means adjacent said elongated strip conductor for increasing the distributed inductance of the delay line thereby reducing the propagation rate of electromagnetic waves therealong.

10. An ultrasonic transducer as defined in claim 9 including, a magnetic flux field source linking with said high permeability means for control of the permeability thereof and thereby controlling the rate of propagation of electromagnetic waves along said line.

11. An ultrasonic transducer as defined in claim 10 wherein said magnetic flux field source comprises a coil adjacent said high permeability means and a source of current connected to said coil for production of a magnetic flux field linking with said high permeability means.

12. An ultrasonic transducer as defined in claim 11 including, means for varying said current source for varying said magnetic flux field.

13. An ultransonic transducer as defined in claim 9 wherein said high permeability means comprises ferrite.

14. An ultrasonic transmitting and/or receiving transducer for generating and/or receiving compressional acoustic waves for use in ultrasonic examination of an object, said transducer comprising,
a piezoelectric member of substantially cylindrical shape and having first and second opposite faces,
first and second electrode means disposed on said first and second faces, respectively,
at least one of said electrode means being in the form of an elongated strip conductor which, together with the other of said electrode means comprises a delay line for inherent delay in the propagation of electromagnetic waves therealong through distributed capacitance and inductance of the delay line,
said one electrode means comprising a plurality of concentric spiral-shaped conductors,
means for acoustically coupling one face of said piezoelectric member to an object under ultrasonic examination, and
means for electrically connecting said concentric spiral-shaped conductors in shunt with the outer ends thereof electrically interconnected and with the inner ends thereof electrically interconnected.

15. In an ultrasonic system for the examination of the interior of objects, such as body parts, of the type which includes an operating system comprising transmitter and receiver means, the improvement comprising,
ultrasonic transducer means associated with said transmitter and receiver means, said ultrasonic transducer comprising first and second electrodes at opposite faces of a piezoelectric member, at least one of said electrodes comprising an elongated strip conductor, said transducer electrodes comprising conductors of a delay line for inherent delay in the propagation of electromagnetic waves therealong, and
means for varying the delay of said delay line to alter the beam pattern of said transducer means, said means for varying the delay of said delay line comprising a high permeability member adjacent said elongated strip conductor.

16. In an ultrasonic system as defined in claim 15 including,
a drive coil at said high permeability member, and
a variable current source connected to said drive coil for controlling the permeability of said high permeability member and time delay of said delay line.

* * * * *